M. Fishel.

Hoop Skirt.

No. 3731. Reissued Nov. 16. 1869.

Witnesses.

C. C. Livingston

Wm. C. Dey

Inventor.

Martin Fishel by his attorney

[illegible]

United States Patent Office.

MARKS FISHEL, ADOLPH OPPER, AND LEO POPPER, OF NEW YORK, N. Y., ASSIGNEES OF MARKS FISHEL.

*Letters Patent No.* 34,182, *dated January* 14, 1862; *reissue No.* 3,731, *dated November* 16, 1869.

DIVISION B.

IMPROVEMENT IN SKELETON-SKIRTS.

The Schedule referred to in these Letters Patent and making part of the same

*To all whom it may concern:*

Be it known that I, MARKS FISHEL, of New York, in the county and State of New York, have invented a certain new and useful Improvement in Skeleton-Skirts; and I do hereby declare that the following is a full and exact description of the same, reference being had to the accompanying drawings, in which—

Similar letters of reference indicate like parts in all the figures.

The nature of my invention consists in securing the hoops to the tapes, through two or more eyelets, inserted in the tapes for that purpose, at each intersection, with suitable means for attaching the hoop to the tape, passing through the said eyelets and across a portion of the tape situated between them.

To enable others to make and use my invention, I will proceed to describe it by the aid of the drawings.

A A A, &c., are the hoops of a skeleton-skirt, constructed in the ordinary manner, and B B B are wide tapes which support the hoops A in their proper position.

My invention relates entirely to the means of securing these at their intersections.

In the tapes B, at each line where a hoop crosses the said tape, I fix two or more eyelets, C C, and pass the fastenings through the said eyelets.

Figure 1:
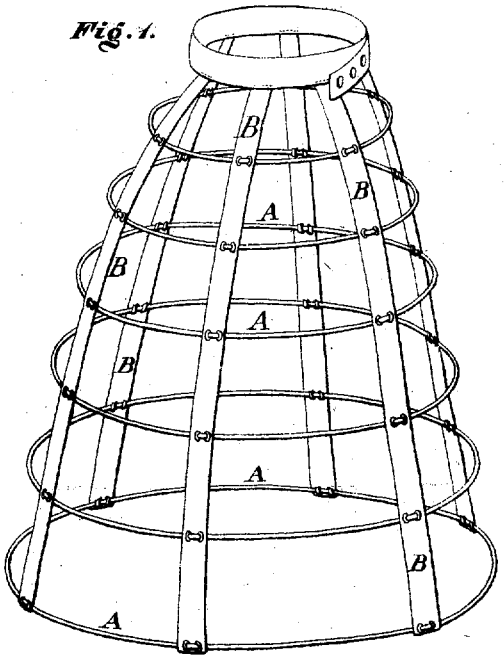
Figure 1 is a perspective view of the skirt complete.
Figure 2:
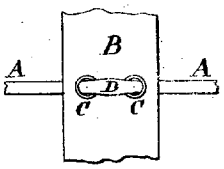
Figures 2 to 6 are detail views, showing two modifications of the method of securing the hoops to the tapes.
Figure 3:
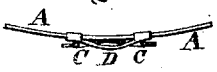
Figure 4:
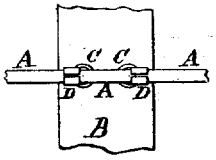

In figs. 2, 3, and 4, a clasp of metal, D, passes through the eyelets, and seizes the hoop, as clearly represented in the drawings.

By this arrangement, there is a given amount of play allowed at the fastening, which causes less strain upon the parts than when they are rigidly secured, while all the wear occasioned thereby comes upon metal surfaces, whereby the construction is made very durable.

Figure 5:
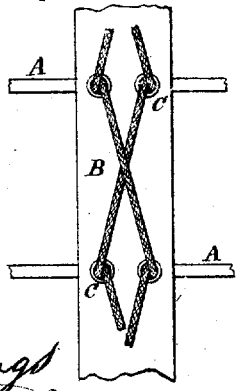
Figure 6:
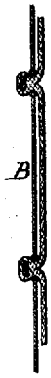

Still another style of fastening is shown in figs. 5 and 6. In these figures, a cord or braid is used to secure the hoops to the tapes, said cord passing through the eyelets in the manner represented.

Either of these forms may be used at pleasure, but I prefer that represented in figs. 2, 3, and 4.

I am aware that a fastening has been secured to a tape for a similar purpose by passing an eyelet through both the clasp and tape, as in the patent granted to W. S. Thompson, September 21, 1858, but such device was not equivalent to mine, inasmuch as the fastening or clasp did not pass through the eyelet and across any part, as in mine, and the strain in that case came all upon that portion of the tape which was embraced between the narrow flanges and the eyelet. This fastening was very insecure, from the well-known ease with which an eyelet may be torn from a piece of cloth, while the security of my fastening is not dependent upon the attachment of the eyelets to the tape, the eyelets serving merely as metallic linings to the holes through which the fastening passes.

There is in the use of my invention no strain tending to tear the eyelet from the tape, but should one become detached from any cause, the fastening remains in the same condition as regards security, except that the hole is liable to become enlarged by wear. But even in that case the second eyelet would remain for a time, and perform duty for both.

My improved means for fastening is believed to be not only simple and cheap, but also to possess advantages in durability over any heretofore known.

Having now fully described my improvement,

What I claim as new in the construction of skeleton-skirts, and desire to secure by Letters Patent, is—

Securing the hoops A A to the tapes B B, by means of fastenings D, or their equivalents, passing through the eyelets C C, and across a portion of the tape between them, substantially as and for the purposes herein set forth.

MARKS FISHEL.

Witnesses:
C. C. LIVINGS,
WM. C. DEY.